United States Patent
Singh et al.

(10) Patent No.: US 12,438,599 B2
(45) Date of Patent: Oct. 7, 2025

(54) SYSTEM AND METHOD FOR RADIO FREQUENCY FINGERPRINT PROFILE GENERATION VIA AIRBORNE RADIOS

(71) Applicant: Rockwell Collins, Inc., Cedar Rapids, IA (US)

(72) Inventors: Rhishi Pratap Singh, Kanpur (IN); Subramanian Ramasamy, Bangalore (IN); Souparno Sengupta, Bangalore (IN); Santosh Multhalli, Hyderabad (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 295 days.

(21) Appl. No.: 18/122,546

(22) Filed: Mar. 16, 2023

(65) Prior Publication Data
US 2024/0007179 A1   Jan. 4, 2024

(30) Foreign Application Priority Data
Jul. 1, 2022   (IN) .............................. 202211038004

(51) Int. Cl.
    *H04B 7/185*   (2006.01)
(52) U.S. Cl.
    CPC ..... *H04B 7/18506* (2013.01); *H04B 7/18513* (2013.01)
(58) Field of Classification Search
    CPC ............ H04B 7/18506; H04B 7/18508; H04B 7/18502; H04B 7/18513; G01C 23/00; G01C 21/00; G08G 5/50
    See application file for complete search history.

(56) References Cited

U.S. PATENT DOCUMENTS

| | | |
|---|---|---|
| 8,611,922 B2 | 12/2013 | Wigren et al. |
| 9,107,178 B2 | 8/2015 | Sydir et al. |
| 9,466,881 B1 | 10/2016 | Berry et al. |
| 9,594,149 B2 | 3/2017 | Siomina et al. |

(Continued)

OTHER PUBLICATIONS

Extended European Search Report dated Dec. 26, 2023; European Application No. 23182875.7.

(Continued)

*Primary Examiner* — Khalid W Shaheed
(74) *Attorney, Agent, or Firm* — Suiter Swantz IP

(57) ABSTRACT

A system for airborne radio frequency (RF) profiling receives a satellite-based (e.g., GNSS) absolute position of an aircraft including at least latitude and longitude at a timestamp, and an aircraft altitude (baro/radio). The system determines a VHF omnidirectional range (VOR)/distance measuring equipment (DME) position fix of the aircraft relative to a VOR/DME ground station. Further, the system receives one or more avionics communication link identifier based on a link to an identified station established by an onboard avionics radio and a link quality indicator (e.g., received signal strength). Avionics links may include high-altitude HF/VHF or low-altitude cellular links, or a combination of both. Based on the available links and link quality identifiers at a given position and a given time, the system generates an RF profile corresponding to that position, which may be downloaded for future use by other aircraft to validate or invalidate a GNSS-based aircraft position.

14 Claims, 5 Drawing Sheets

(56) References Cited

U.S. PATENT DOCUMENTS

| | | | |
|---|---|---|---|
| 9,609,615 B2 | 3/2017 | Jung | |
| 9,689,686 B1 | 6/2017 | Carmack et al. | |
| 9,725,171 B1 | 8/2017 | Carmack et al. | |
| 9,847,033 B1 | 12/2017 | Carmack et al. | |
| 10,466,700 B1 | 11/2019 | Carmack et al. | |
| 10,505,622 B1* | 12/2019 | Stein | H04W 4/40 |
| 10,979,876 B2 | 4/2021 | Alexander et al. | |
| 11,026,242 B2 | 6/2021 | Wigren et al. | |
| 11,313,974 B2 | 4/2022 | Savoy, Jr. et al. | |
| 2012/0265374 A1* | 10/2012 | Yochum | G05D 1/0607 |
| | | | 701/5 |
| 2017/0219685 A1 | 8/2017 | Chikkappa | |
| 2018/0047295 A1* | 2/2018 | Ricci | G08G 5/727 |
| 2019/0278302 A1 | 9/2019 | Sundaresan et al. | |
| 2021/0116558 A1* | 4/2021 | Chan | G08G 5/22 |
| 2021/0225181 A1* | 7/2021 | Feyereisen | G08G 5/51 |
| 2022/0066044 A1 | 3/2022 | McDonald et al. | |
| 2023/0358883 A1* | 11/2023 | Lebrat | G01S 13/42 |

OTHER PUBLICATIONS

Jorge Pereira et al. "Dual use CNS boosts civil-military interoperability", 2018 Integrated Communications, Navigation, Surveillance Conference (ICNS), IEEE, Apr. 10, 2018.

* cited by examiner

410 — Receiving, from a communications management unit (CMU) of the aircraft, at least one avionics communications link identifier including 1) a station identifier (SID) corresponding to a ground control station configured for establishing an avionics communications link to the aircraft and 2) a link quality indicator indicative of a signal strength of the avionics communications link

↓

412 — Generating an RF profile corresponding to the absolute position by correlating the altitude, the VOR/DME position fix, and the avionics communication link identifier associated with the timestamp of the absolute position

↓

414 — Retrieving, from a memory coupled to the positioning system, at least one reference RF profile generated prior to the timestamp and corresponding to the latitude and the longitude of the absolute position

↓

416 — Determining, via the positioning system, a validity of the absolute position by comparing the generated RF profile and the at least one reference RF profile

FIG. 4B

SYSTEM AND METHOD FOR RADIO FREQUENCY FINGERPRINT PROFILE GENERATION VIA AIRBORNE RADIOS

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

Indian Provisional Patent Application No. 202211038004 filed Jul. 1, 2022 relating to SYSTEM AND METHOD FOR RADIO FREQUENCY FINGERPRINT PROFILE GENERATION VIA AIRBORNE RADIOS;

and

Concurrently filed U.S. patent application Ser. No. 18/122,531 and relating to SYSTEM FOR LOCAL AREA DETECTION AND ALERTING OF GLOBAL NAVIGATION SATELLITE SYSTEM (GNSS) SPOOFING.

Said Indian Provisional Patent Application No. 202211038004 and said U.S. patent application Ser. No. 18/122,531 are herein incorporated by reference in their entirety.

BACKGROUND

Alternative position, navigation, and timing (APNT) systems and methods present a potential alternative to increased radio frequency (RF) interference with global navigation satellite systems (GNSS; e.g., GPS, GLONASS, BeiDou, Galileo, IRNSS/NavIC, QZSS). One potential APNT application is the L-band Digital Aeronautical Communication System (LDACS), a terrestrial line-of-sight (LOS) system operating in the L-band (e.g., around 1-2 GHz) and compatible with GNSS and other existing L-band systems. However, LDACS would require massive investments in ground-based infrastructure, surveying, and new onboard equipment.

RF fingerprinting may provide ad hoc APNT using low-cost wireless radios for indoor positioning (e.g., via Bluetooth, ZigBee, or other wireless protocols) or outdoor positioning (e.g., using AM/FM radio signals or television broadcast signals). However, due to the nature of their transmission, these terrestrial signals are too unreliable for use in association with safety-critical precision avionics positioning.

SUMMARY

In a first aspect, an aircraft-based system for airborne radio frequency (RF) profiling via avionics radios is disclosed. In embodiments, the system receives a GNSS-driven absolute position of the aircraft based on positioning signals receives from a constellation of navigational satellites. The system receives an altitude of the aircraft. The system receives a VHF omnidirectional range/distance measuring equipment (VOR/DME) position fix relative to a VOR/DME ground station. The system receives one or more additional avionics communications link identifier from the aircraft communication management unit (CMU), each link identifier identifying a ground station to which an avionics radio aboard the aircraft establishes a communications link and a quality indicator of the communications link (e.g., a received signal strength indicator (RSSI)). The system correlates the absolute position, altitude, and any available avionics communications link identifiers, to generate an RF profile corresponding to the absolute position. The RF profile may be stored to memory for further post-processing or future use to validate GNSS readings corresponding to the absolute position.

In some embodiments, the available avionics communications link identifiers include high-altitude avionics links, e.g., satellite communications (satcom) links, VHF visual line of sight (LOS) communications links, and/or HF beyond LOS (BLOS) communications links.

In some embodiments, the available avionics communications link identifiers include low-altitude avionics links, e.g., cellular communications links between the aircraft and a ground-based cellular communications station.

In some embodiments, the system stores to memory a route profile comprising a sequence of generated RF profiles corresponding to the flight path of the aircraft.

In some embodiments, the system compares the generated RF profile to a stored (previously generated) reference RF profile corresponding to the current absolute position to validate or invalidate the GNSS-driven absolute position based on a similarity to, or a deviation of, the generated RF profile relative to the reference RF profile.

In some embodiments, the system validates the current GNSS-driven absolute position based on a similarity of the generated RF profile to the reference RF profile.

In some embodiments, the system invalidates the current GNSS-driven absolute position based on sufficient deviation of the generated RF profile from the reference RF profile.

In some embodiments, the aircraft altitude is either a pressure altitude determined by a pitot-static system or other like barometric altimeter or a radio altitude determined by a radio altimeter.

In a further aspect, a method for aircraft-based RF profiling is also disclosed. In embodiments, the method includes receiving, via an aircraft-based GNSS-driven positioning system, a set of positioning signals from a constellation of navigational satellites (e.g., ideally at least four satellites). The method includes determining, via the GNSS-driven positioning system, an absolute position of the aircraft including at least a latitude, longitude, and timestamp. The method includes determining, via an aircraft-based altimeter, an altitude of the aircraft consistent with the timestamp. The method includes receiving a VHF omnidirectional range/distance measuring equipment (VOR/DME) position fix of the aircraft (e.g., a bearing angle and slant distance between the aircraft and a VOR/DME ground station). The method includes receiving, from an aircraft-based communication management unit (CMU), a set of avionics communication link identifiers, each link identifier including a station ID corresponding to a ground station to which an avionics radio aboard the aircraft has established a communications link and a link quality assessment of the communications link (e.g., a received signal strength indicator (RSSI)). The method includes generating an RF profile for the current absolute position by correlating the altitude, VOR/DME position fix, and any available avionics communication link identifiers for the current timestamp. In some embodiments, the method further includes retrieving from memory a reference RF profile previously generated for the current absolute position. In some embodiments, the method includes validating or invalidating the current absolute position by comparing the generated RF profile to the reference RF profile.

In some embodiments, the method includes validating the absolute position based on a similarity of the generated RF profile to the reference RF profile.

In some embodiments, the method includes invalidating the absolute position based on sufficient deviation of the generated RF profile from the reference RF profile.

In some embodiments, the method includes determining the aircraft altitude via either a barometric altimeter (e.g., pitot-static system) or a radio altimeter.

In some embodiments, the method includes receiving at least one avionics communications link identifier based on a high-altitude communications link, e.g., a VHF visual line of sight (LOS) link to a ground station, a HF beyond LOS (BLOS) link to a HF ground station, or a satellite communications (satcom) link to a ground station relayed via one or more communications satellites.

In some embodiments, the method includes receiving at least one avionics communications link identifier based on a cellular communications link to a cellular ground station, e.g., 3G/4G/5G cellular links or L-band digital aeronautical communications system (LDACS) cellular links.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

and FIGS. 4A and 4B are flow diagrams illustrating a method for alternative aircraft positioning via RF fingerprinting according to the inventive concepts disclosed herein.

DETAILED DESCRIPTION

Figure 1:
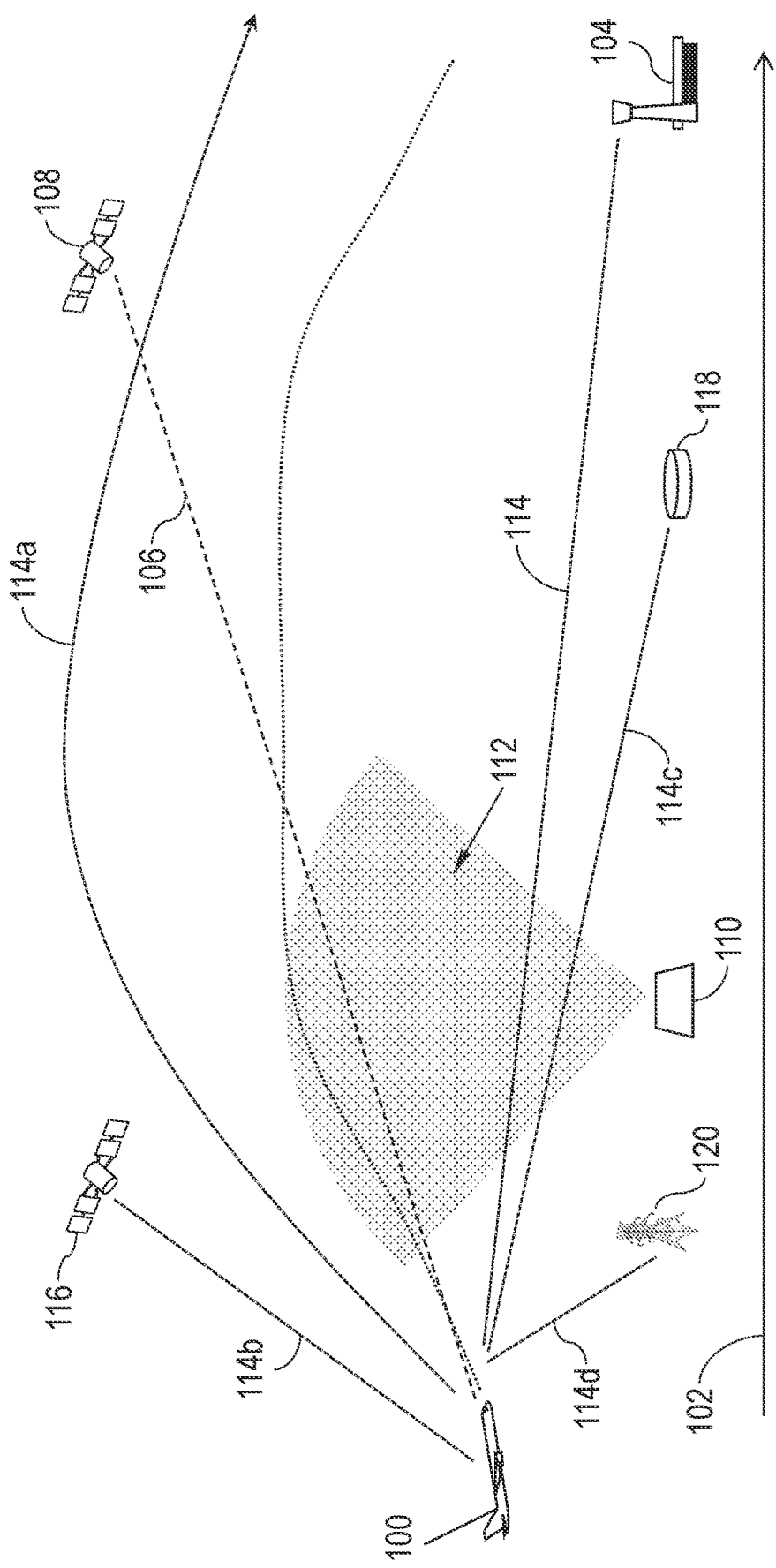
FIG. 1 is an environmental diagram showing an aircraft inflight and avionics communication links available to the aircraft along its flight path.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to systems and methods for aircraft-based RF profile generation based on avionics communication links, and validation of GNSS or other satellite-based absolute positioning via RF profile generation.

Referring now to FIG. 1, an aircraft 100 is shown.

In embodiments, the aircraft 100 may execute a flight path 102 comprising various flight segments, e.g., takeoff, climb, cruise, descent, and landing at a destination airport 104. While executing the flight path 102, the aircraft 100 may continually determine its current position, reporting the current position to air traffic control and/or proximate aircraft (e.g., via Automatic Dependent Surveillance-Broadcast (ADS-B) or other like surveillance systems) so that the aircraft and the proximate aircraft may maintain safe separation as the aircraft 100 is guided toward the destination airport 104 by traffic controllers at the destination airport and along the flight path. For example, the aircraft 100 may incorporate a positioning system that receives satellite-based navigational or positioning signals 106 from navigational satellites 108 (e.g., positioning signals from at least four different navigational satellites optimally arrayed may be trilaterated into a precise position/navigation/timing (PNT) solution in four dimensions: latitude, longitude, elevation, time). Based on the navigational and timing data incorporated within the positioning signals 106, the positioning system aboard the aircraft 100 may determine its own position (e.g., a current latitude and longitude at a precise time, or timestamp) based on the travel time of the positioning signals between transmission by their originating navigational satellites 108 and reception by the positioning system.

In embodiments, the aircraft 100 may not receive sufficient positioning signals 106 to determine a sufficiently precise absolute position. For example, the flight path 102 may place the aircraft beyond visual line of sight (LOS) of enough navigational satellites 108 for sufficiently precise positioning. Alternatively, portions of the flight path 102 may be susceptible to spoofers 110. For example, spoofers 110 may create interference 112 by jamming the positioning signals 106. In some cases, spoofers 110 may introduce false positioning information threatening the integrity of satellite-based positioning systems, requiring the aircraft 100 and/or the destination airport 104 to adjust protection levels and/or error bounds associated with their own position, navigation, and timing (PNT) solutions to account for the heightened threat. These higher protection bounds may in turn complicate or even preclude the use of, e.g., Localizer Performance with Vertical Guidance (LPV), Required Navigation Performance (RNP), Ground Based Augmentation System (GBAS), and/or other specialized navigational tools and/or landing aids (either along the flight path 102 generally or in the vicinity of the destination airport 104).

In embodiments, the aircraft 100 may establish or maintain various avionics-based communication links 114 along the flight path 102 via the aircraft's communication systems. For example, the aircraft 100 may communicate with ground-based traffic control stations within visual line of sight (LOS) of the aircraft at assigned frequencies within the VHF band (e.g., generally between 118 and 137 MHz). The destination airport 104 or controlling ground station may assign a frequency or frequency channel (an assigned section of the frequency spectrum, e.g., 25 kHz, or occasionally 8.33 kHz in Europe) to the aircraft 100, and the aircraft will maintain communications on the assigned channel until instructed to re-establish the link on another channel, until the aircraft is "handed over" to another control station, or until the link is inadvertently lost.

Similarly, in embodiments the aircraft 100 may establish or maintain avionics communications links 114a with control facilities beyond VLOS (BLOS). For example, aircraft 100 along polar or transoceanic routes may be configured for High Frequency Data Link (HFDL), via which the aircraft may establish long-distance data and/or voice links with a network of HF global stations (HGS) around the planet, continually scanning channels on the HF band (e.g., between 3 and 30 MHZ) for the most efficient channel and communicating with the BVLOS control facilities via HF-band signals at the selected frequency and propagated via the earth's ionosphere. Further, in embodiments the aircraft 100 may establish and maintain high-altitude voice and/or data links 114b relayed by communications satellites 116 (satellite communications, or "satcom").

In embodiments, the aircraft 100 may establish avionics communications links to ground-based VHF omnidirectional range (VOR)/Distance Measuring Equipment (DME) radio beacons 118 (e.g., or tactical air navigation (TACAN) beacons, a military equivalent) along the flight path at fixed and known locations. For example, VOR radio beacons 118 may transmit modulated signals having a phase difference; by demodulating the transmitted signals the aircraft 100 may determine a VOR position fix 114c, or a bearing angle to the radio beacon based on the phase difference. In some embodiments, the aircraft 100 may include a DME interrogator or transponder for initiating a DME exchange with the VOR radio beacon 118. Accordingly, the VOR position fix may include a slant distance between the aircraft 100 and the VOR radio beacon 118 (e.g., the slant distance accounting for the altitude of the aircraft above the radio beacon) based on propagation delay of pulsed signals transmitted between the aircraft and the VOR radio beacon.

Further, in embodiments the aircraft 100 may, at lower altitudes along the flight path 102, establish and maintain low-altitude communications links 114d with ground-based communications infrastructure 120. For example, the aircraft 100 may establish 3G, 4G, 5G, L-band digital aeronautical communication system (LDACS), and/or other cellular or wireless communications links throughout the flight path 102.

In embodiments, each of the avionics communications links 114, 114a-114d may be associated with measurable link quality indicators, e.g., received signal strength indicators (RSSI). For example, RSSI readings may indicate the transmission power of a particular station, a presence or lack of obstacles between the station and the aircraft 100, and/or other factors affecting the signal strength.

Figure 2:
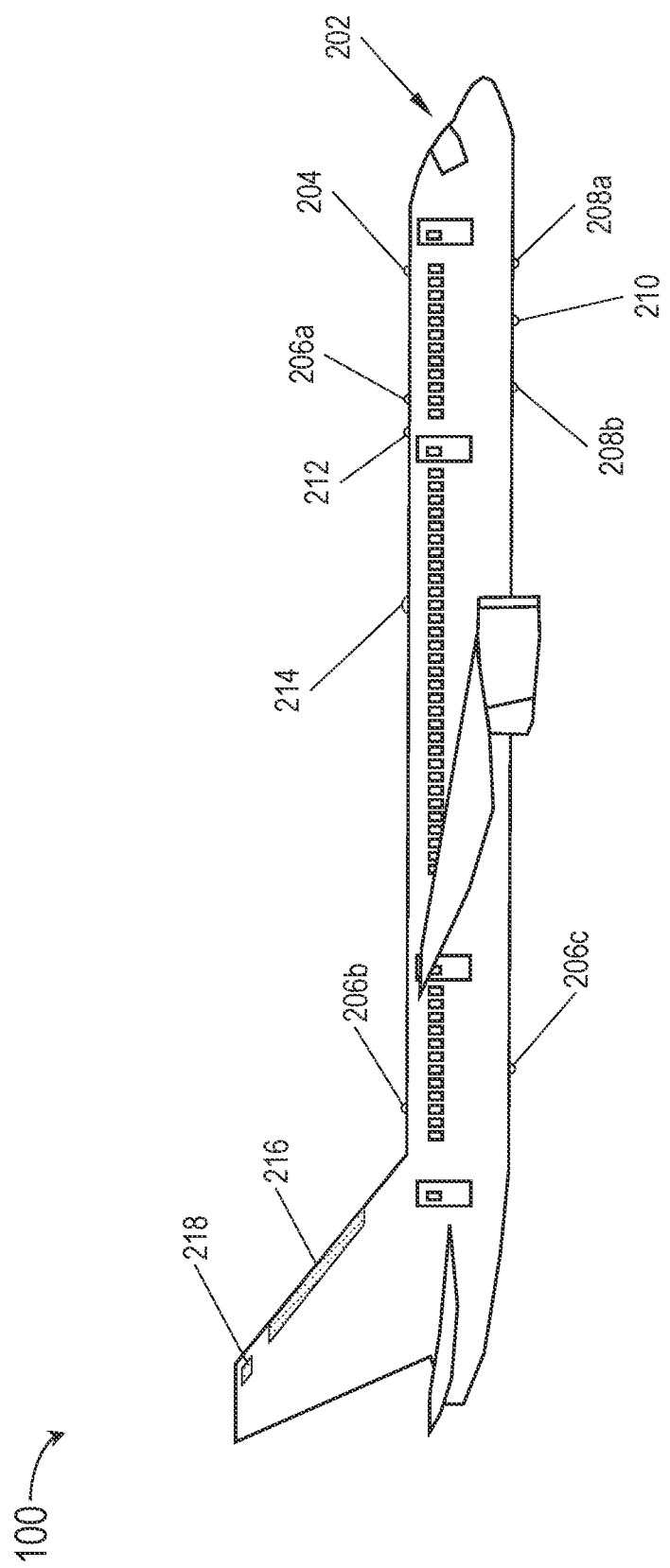
FIG. 2 is a diagrammatic illustration of the aircraft of FIG. 1, showing receiver infrastructure for the avionics communication links of FIG. 1.

Referring to FIG. 2, the aircraft 100 is shown.

In embodiments, the aircraft 100 may be configured with various external receivers and/or antenna elements for establishing and maintaining avionics communications links from avionics radios (e.g., voice and/or data) within the cockpit 202 of the aircraft to the ground-based and/or satellite-based communications infrastructure shown by FIG. 1.

For example, the aircraft 100 may include GNSS antenna 204; VHF antennas 206a-206c; DME antennas 208a-208b; radio altimeter (radalt) antenna 210 (e.g., via which the radio altimeter of the aircraft 100 may determine a current altitude); cellular antenna 212; SATCOM antenna 214; HF antenna 216, and/or VOR antenna 218. In some embodiments, the aircraft 100 may include more than one of a particular antenna element, e.g., directional antennas (left-side, center, and right-side VHF antennas 206a, 206b, 206c; left-side and right-side DME antennas 208a, 208b).

Figure 3:
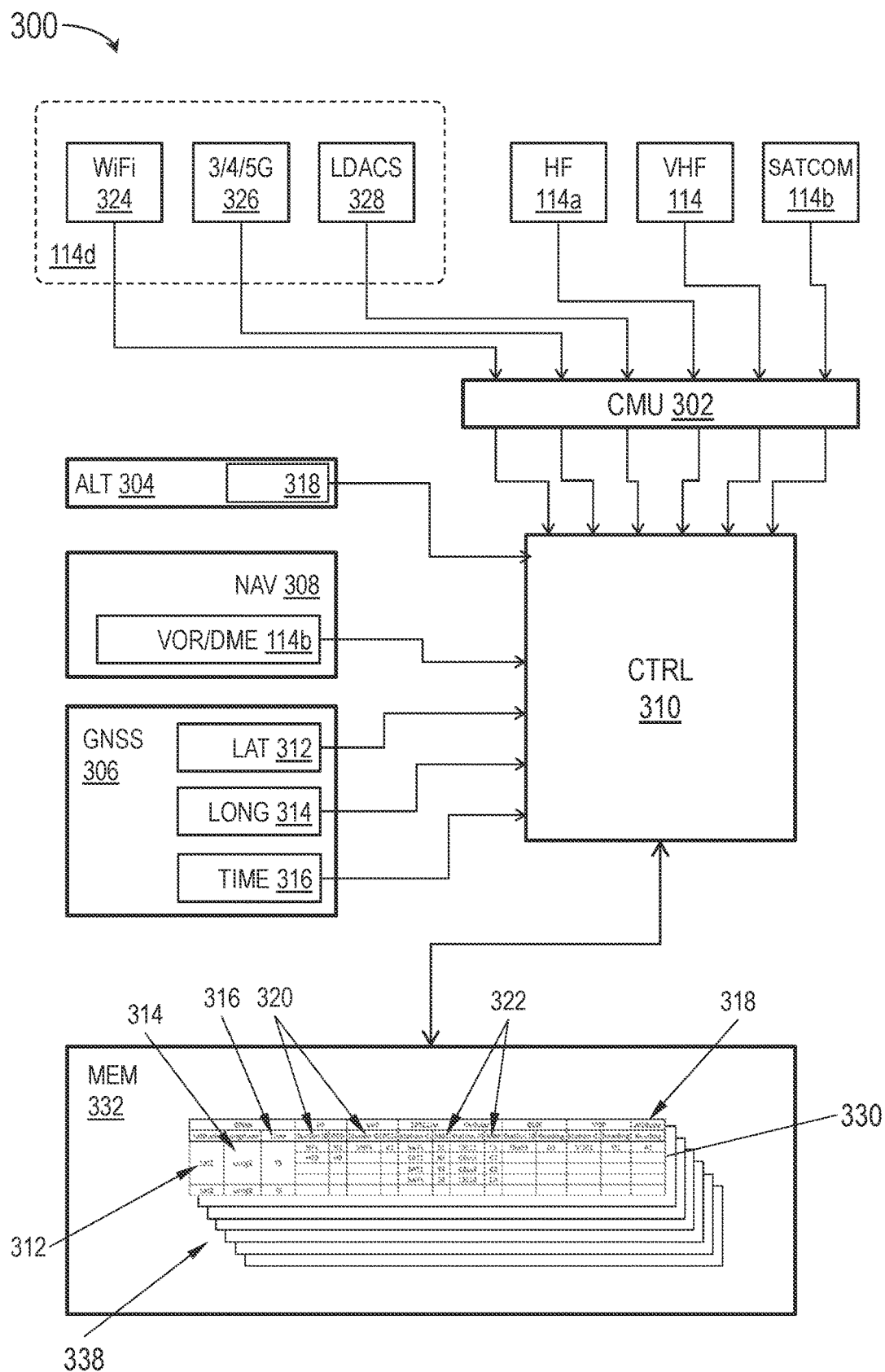
FIG. 3 is a block diagram illustrating a system for airborne radio frequency (RF) profile generation according to the inventive concepts disclosed herein.

Referring now to FIG. 3, a positioning system 300 of the aircraft (100, FIG. 1) is shown.

In embodiments, the positioning system 300 may communicate with a communications management unit 302 (CMU), an altimeter 304, a GNSS or other satellite-based absolute positioning system 306, and a navigational system 308 of the aircraft 100. For example, control processors 310 of the positioning system 300 may initiate an RF profiling session upon takeoff, e.g., as the aircraft 100 commences its assigned flight path (102, FIG. 1). In embodiments, the control processors 310 may continually poll the absolute positioning system 306 for a precise GNSS-driven position of the aircraft, e.g., a latitude 312 and longitude 314 of the aircraft at a precise timestamp 316. For example, the absolute positioning system 306 may operate within protection levels and/or error bounds as to provide optimal protection against GNSS position spoofing. In embodiments, the control processors 310 may poll the altimeter 304 and the aircraft navigational system 308 for, respectively, an independent aircraft altitude 318 (e.g., independent of, and generally more precise than, the altitude provided via the GNSS-driven absolute position) and VOR/DME position fix 114c corresponding to the current timestamp 316. For example, at higher altitudes the aircraft altitude 318 may be a barometric or pressure altitude determined via a barometric altimeter or pitot/static system or other like barometric altimeter. At lower altitudes, the aircraft altitude 318 may instead be determined via a radio altimeter (radalt).

In embodiments, the control processors 310 may fuse position fix information corresponding to a particular timestamp 316 with avionics link quality information obtained from the CMU 302. For example, the CMU 302 may continually survey any current avionics communications links established by avionics radios aboard the aircraft 100 to identify the linking ground station (e.g., or satellite) and quantify the link quality of each avionics communications link corresponding to the current timestamp 316. It may be assumed that, for a particular point in space, the array of available avionics communications links and the signal strength of each available link will remain consistent (e.g., subject to atmospheric and/or traffic conditions).

In embodiments, the CMU 302 may, for each avionics communications link active at the current timestamp 316 involving avionics radios aboard the aircraft 100, determine at least a station identifier 320 (SID) and received signal strength indicator 322 (RSSI) for each link, e.g., low altitude links 114d, including WiFi/wireless links 324, 3G/4G/5G cellular links 326, LDACS cellular links 328) and/or high-altitude links (HF/BLOS links 114a, VHF/LOS links 114, and/or SATCOM links 114b). For example, the control processors 310 may review all current link quality information received from the CMU 302 and fuse all link quality information corresponding to the current timestamp 316 to generate an RF profile 330 specific to the latitude 312 and longitude 314 corresponding to the current timestamp 316. In some embodiments, an RF profile 330 may be tied not only to the current latitude 312 and longitude 314, but also to an altitude 318 corresponding to the current timestamp 316, fixing the RF profile 330 in three dimensions.

In embodiments, the positioning system 300 may include a memory 332 for storing each generated RF profile 330. For example, RF profiles 330 may be stored to memory 332 and downloaded for refinement and/or data cleaning (e.g., removing outlying data points). In embodiments, refined RF profiles 330 may be uploaded to other aircraft and/or ground control facilities for validation of position information along the flight path 102.

In embodiments, the positioning system 300 may use reference RF profiles 330 stored to memory 332 (e.g., or downloaded to memory from another aircraft or control facility) to validate GNSS or other satellite-based navigation information along a flight path 102. For example, the positioning system 300 may at any time along its flight path 102 poll the absolute positioning system 306 for a current GNSS-driven latitude 312, longitude 314, and timestamp 316 (and poll the altimeter 304 for a current altitude 318) and, as described above, generate an RF profile 330 corresponding to the current aircraft position as determined by the absolute positioning system. In embodiments, the control processors 310 may search for and retrieve from memory 332 any reference RF profiles 330 corresponding to the current latitude 312, longitude 314, and altitude 318.

By comparing the currently generated RF profile 330 to any reference RF profiles matching the current position of the aircraft, the positioning system 300 may validate the accuracy of the position information retrieved from the absolute positioning system 306. For example, if any available corresponding reference RF profiles 330 match the current RF profile (e.g., based on similarities in SID 320 and/or RSSI 322), the positioning system 300 may conclude that the reference RF profiles validate the accuracy of the absolute positioning system. Similarly, if the current RF profile 330 sufficiently deviates from the reference RF profiles (e.g., based on dissimilar links and/or SIDs 320, or variances in RSSI 322 with respect to a matching SID), e.g., beyond a predetermined threshold level, the positioning system 300 may conclude that the reference RF profiles invalidate the absolute positioning system 306. Accordingly, the positioning system 300 may conclude that interference (112, FIG. 1), jamming, and/or spoofing may be affecting GNSS availability, or may forward relevant information to a ground-based control facility for further analysis or spoofer detection. For example, the positioning system 300 may adjust protection levels and/or error bounds associated with the absolute positioning system 306.

Figure 4A:
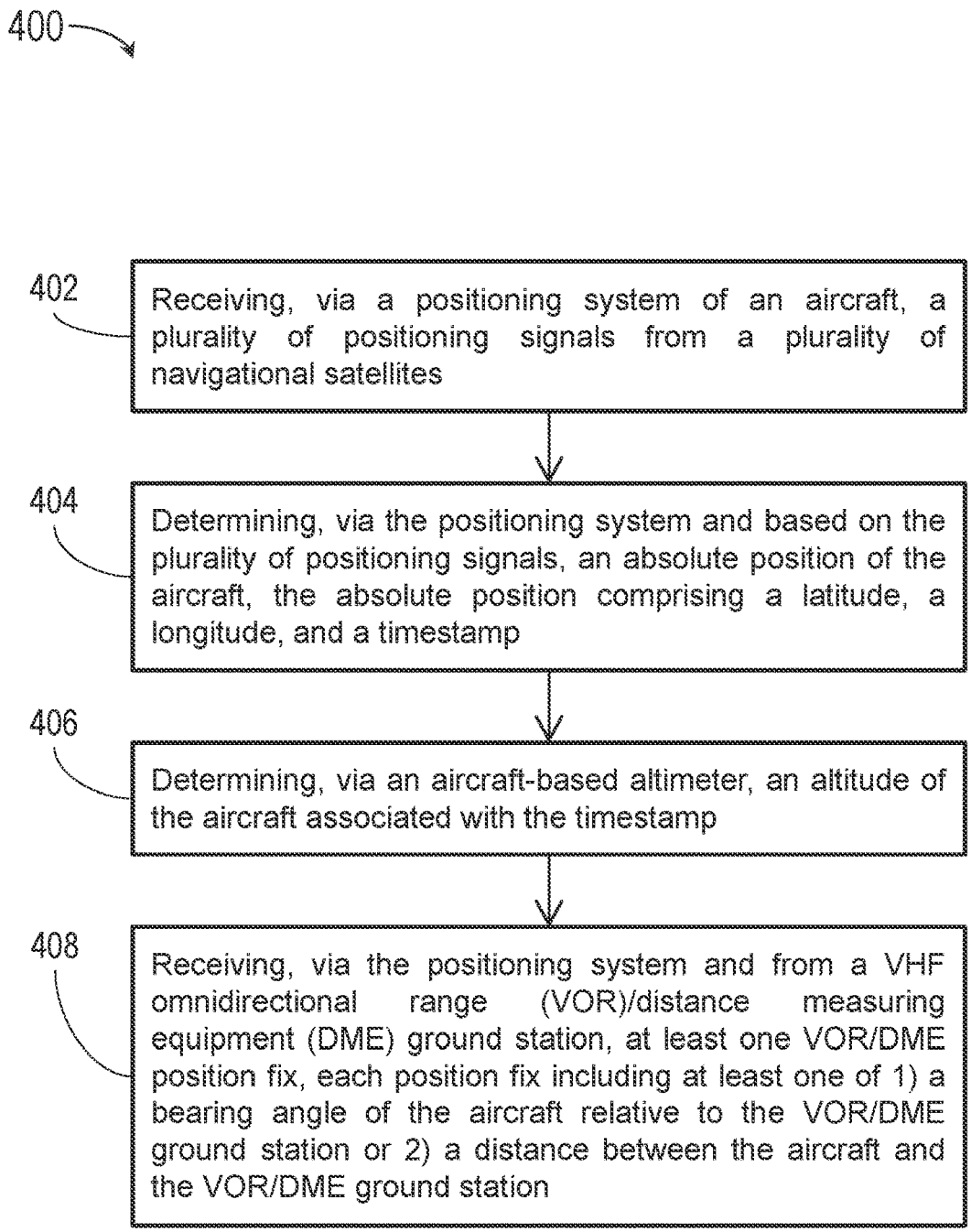

Referring now to FIG. 4A, the method 400 may be implemented by the aircraft 100 and may include the following steps.

At a step 402, an aircraft positioning system receives a set of positioning signals and timing information from a constellation of navigational satellites.

At a step 404, the positioning system determines, based on the received positioning signals, an absolute position of the aircraft at a particular timestamp (e.g., a precise latitude and longitude).

At a step 406, an aircraft-based altimeter determines an independent altitude of the aircraft corresponding to the timestamp. For example, the altitude may be a pressure altitude determined by a pitot-static system or other barometric altimeter, or a radio altitude determined by a radio altimeter.

At a step 408, the positioning system receives a VOR/DME position fix corresponding to the current timestamp, the VOR/DME fix including a bearing angle and a slant distance to the VOR/DME radio beacon.

At a step 410, referring also to FIG. 4B, the positioning system receives one or more avionics communication link identifiers from the aircraft communication management unit (CMU). For example, link identifiers include a station ID and a received signal strength indicator (RSSI) or other link quality identifier associated with the station ID and the avionics communications link.

At a step 412, the positioning system generates a current RF profile by fusing any available avionics communication link identifiers corresponding to the current timestamp with the absolute position (latitude, longitude, altitude) of the aircraft at that timestamp.

At a step 414, the positioning system evaluates the current absolute position of the aircraft by retrieving from memory any reference RF profiles corresponding to the current latitude, longitude, and altitude of the aircraft.

At a step 416, the positioning system determines a validity of the current absolute position (e.g., and/or the absolute positioning system) based on a comparison of the current RF profile to any corresponding reference RF profiles. If, for example, the current RF profile sufficiently matches the reference RF profiles (e.g., in terms of matching links/station identifiers and link quality indicators), the positioning system may conclude that the current absolute position is valid. If, however, the current RF profile deviates from the reference RF profiles to at least a threshold level, the positioning system may invalidate the current aircraft position.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for airborne radio frequency (RF) profile generation, comprising: at least one processor communicatively coupled to one or more avionics systems aboard an aircraft, the at least one processor configured to: receive at least one absolute position of the aircraft generated by a satellite-based navigational receiver of the aircraft, the absolute position including at least a timestamp, a latitude, and a longitude; receive, from an aircraft-based altimeter, at least one altitude of the aircraft: receive, from a navigational system of the aircraft, at least one VOR/DME position fix including at least one of:
   a bearing angle of the aircraft corresponding to a VHF (Very High Frequency) omnidirectional range (VOR)/ Distance Measuring Equipment (DME) ground station;
   or
   a distance between the aircraft and the VOR/DME ground station: receive, from a communications management unit (CMU) of the
   aircraft, at least one avionics communication link identifier comprising:
   a station identifier (SID) corresponding to a ground control station configured for establishing a communications link to the aircraft:
   and
   a link quality indicator indicative of a signal strength of the communications link; and generate at least one RF profile corresponding to each absolute
   position by correlating the altitude, the VOR/DME position fix, and the
   avionics communication link identifier associated with the timestamp of the absolute position; and at least one memory coupled to the processor, the memory configured for
   storage of the generated RF profile.

2. The system of claim 1, wherein the communications link includes at least one high-altitude communications link selected from a group including:
   a satellite-based communications (satcom) link relayed between the aircraft and the ground control station by one or more communications satellites;
   a very high frequency (VHF) communications link between the aircraft and a ground control station within visual line of sight (VLOS) of the aircraft via one or more channels associated with a frequency between 30 and 300 MHz;
   and
   a high frequency (HF) communications link between the aircraft and a ground control station beyond VLOS of the aircraft via one or more channels associated with a frequency between 2 and 30 MHz.

3. The system of claim 1, wherein the communications link includes at least one cellular communications link between the aircraft and at least one ground-based cellular control station.

4. The system of claim 1, wherein the at least one memory is configured for storage of at least one route profile comprising a sequence of two or more generated RF profiles corresponding to a flight path flown by the aircraft.

5. The system of claim 1, wherein the at least one processor is further configured to:
   retrieve from the memory at least one reference RF profile corresponding to the absolute position;
   and
   determine a validity of the absolute position by comparing the at least one RF profile to the at least one reference RF profile.

6. The system of claim 5, wherein the at least one processor is configured to validate the absolute position based on a similarity of the at least one reference RF profile and the at least one RF profile.

7. The system of claim 5, wherein the at least one processor is configured to invalidate the absolute position based on a deviation of the at least one RF profile from the at least one reference RF profile to at least a threshold level.

8. The system of claim 1, wherein the altitude includes at least one of:
   a barometric altitude;
   or
   a radio altitude.

9. A method for aircraft-based radio frequency (RF) profiling, the method comprising:
   receiving, via a positioning system of an aircraft, a plurality of positioning signals from a plurality of navigational satellites;
   determining, via the positioning system and based on the plurality of positioning signals, an absolute position of the aircraft, the absolute position comprising a latitude, a longitude, and a timestamp;
   determining, via an aircraft-based altimeter, an altitude of the aircraft associated with the timestamp;
   receiving, via the positioning system and from a VHF (Very High Frequency) omnidirectional range (VOR)/ distance measuring equipment (DME) ground station, at least one VOR/DME position fix, each position fix including at least one of 1) a bearing angle of the aircraft relative to the VOR/DME ground station or 2) a distance between the aircraft and the VOR/DME ground station;
   receiving, from a communications management unit (CMU) of the aircraft, at least one avionics communications link identifier including 1) a station identifier (SID) corresponding to a ground control station configured for establishing an avionics communications link to the aircraft and 2) a link quality indicator indicative of a signal strength of the avionics communications link;
   generating an RF profile corresponding to the absolute position by correlating the altitude, the VOR/DME position fix, and the avionics communication link identifier associated with the timestamp of the absolute position;
   retrieving, from a memory coupled to the positioning system, at least one reference RF profile generated prior to the timestamp and corresponding to the latitude and the longitude of the absolute position; and determining, via the positioning system, a validity of the absolute position by comparing the generated RF profile and the at least one reference RF profile.

10. The method of claim 9, wherein determining, via the positioning system, a validity of the absolute position by comparing the generated RF profile and the at least one reference RF profile includes:

validating the absolute position based on a similarity of the generated RF profile and the at least one reference RF profile.

11. The method of claim 9, wherein determining, via the positioning system, a validity of the absolute position by comparing the generated RF profile and the at least one reference RF profile includes:

invalidating the absolute position based on a deviation of the generated RF profile from the at least one reference RF profile to at least a threshold level.

12. The method of claim 9, wherein determining, via the positioning system, an altitude of the aircraft associated with the timestamp includes:

determining, via at least one of a barometric altimeter or a radio altimeter, an altitude of the aircraft associated with the timestamp.

13. The method of claim 9, wherein receiving, from a CMU of the aircraft, at least one avionics communications link identifier including 1) a station identifier (SID) corresponding to a ground control station configured for establishing an avionics communications link to the aircraft and 2) a link quality indicator indicative of a signal strength of the avionics communications link includes:

receiving at least one avionics communications link identifier associated with a high-altitude communications link selected from a group including:

a satellite-based communications (satcom) link relayed between the aircraft and the ground control station by one or more communications satellites;

a very high frequency (VHF) communications link between the aircraft and a ground control station within the aircraft's visual line of sight (VLOS) via one or more channels associated with a frequency between 30 and 300 MHz; and a high frequency (HF) communications link between the aircraft and a ground control station beyond the aircraft's VLOS via one or more channels associated with a frequency between 2 and 30 MHz.

14. The method of claim 9, wherein receiving, from a CMU of the aircraft, at least one avionics communications link identifier including 1) a station identifier (SID) corresponding to a ground control station configured for establishing an avionics communications link to the aircraft and 2) a link quality indicator indicative of a signal strength of the avionics communications link includes:

receiving at least one avionics communications link identifier associated with a cellular communications link between the aircraft and at least one ground-based cellular control station.

\* \* \* \* \*